Jan. 19, 1965
M. J. LAVERTY
3,166,177
HOPPER FEEDING MECHANISM
Filed Oct. 31, 1963
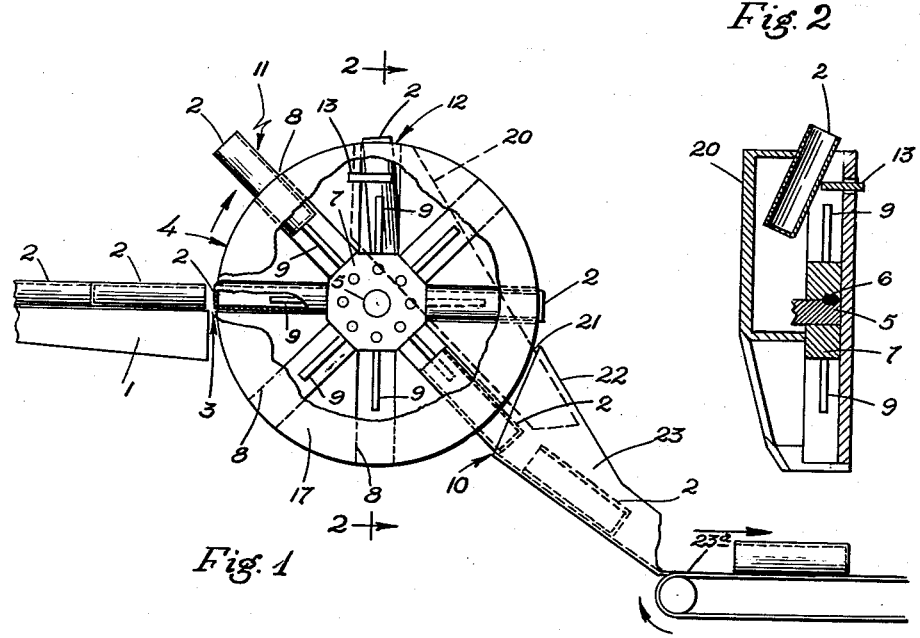
Fig. 2
Fig. 1
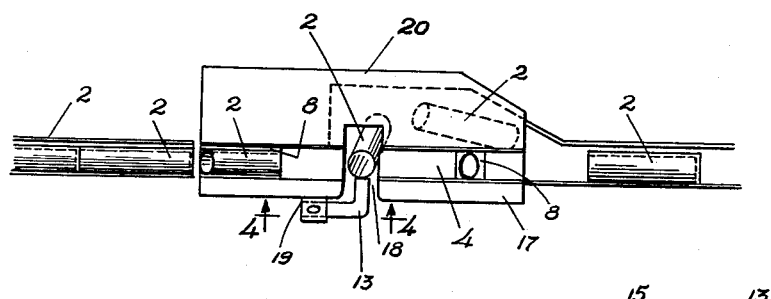
Fig. 3
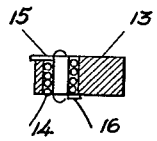
Fig. 4
BY *Hopgood & Calimafde*
ATTORNEYS

United States Patent Office 3,166,177
Patented Jan. 19, 1965

3,166,177
HOPPER FEEDING MECHANISM
Martin J. Laverty, Jericho, N.Y., assignor to Murray Manufacturing Corporation, Brooklyn, N.Y., a corporation of New York
Filed Oct. 31, 1963, Ser. No. 320,373
4 Claims. (Cl. 198—33)

This invention relates to an apparatus for feeding parts in their correct oriented position to a station in an assembly line for further processing and, in particular, the invention relates to a hopper feeding mechanism for feeding hollow parts having closed and open ends.

The usual practice of feeding randomly oriented parts to an assembly line and of placing them by a hopper feeding means in a preferred oriented position is to recycle back to the supply area parts oirented improperly. A high percentage usually are re-routed in this manner according to the shape, weight and physical makeup of the part. Generally, such techniques require a backward and forward flow of material parts which is not efficient. This is particularly true in the random feeding of hollow parts having a closed bottom and an open top.

It is an object of my invention to provide a hopper feeding mechanism adapted through a cooperation of elements to orient randomly fed hollow parts into a preferred direction.

Another object is to provide a system for moving randomly aligned hollow parts in one direction towards a discharge station while assuring a preferred orientation of the hollow parts at the discharge station.

These and other objects will more clearly appear from the following disclosure and the accompanying drawings wherein:

FIG. 1 shows in elevation one embodiment of a hopper feeding mechanism provided by the invention;

FIG. 2 is a cross section of the mechanism shown in FIG. 1 taken along line 2—2;

FIG. 3 shows in plan view the embodiment illustrated in FIG. 1; and

FIG. 4 depicts an enlarged cross section of a portion of FIG. 3 taken along line 4—4 thereof.

Stating it broadly, my invention comprises a feeding mechanism for orienting in a preferred direction hollow parts having open and closed ends. The feeding mechanism includes a rotatable member having open slots radially disposed therein extending to the periphery thereof and adapted to receive and confine therein a hollow part at a first station. Each of said slots has a part-supporting finger therein extending radially from the bottom thereof and terminating intermediate the bottom and the top (periphery of the rotatable means) of each slot, the finger being adapted to enter the hollow of the part and carry it bottom-up to a discharge station. The discharge station is located relative to the first station to cause an axial reversal of the part. A pawl is mounted near one face of the rotatable member and is biased to enter each of the slots during rotation of the member and exert a transverse deflecting force without reversing the axial orientation of parts confined bottom-down in the slots but not carried by the fingers therein. Adjacent the other face of the rotatable member, a chamber is provided for receiving parts deflected therein by the pawl. In addition, an output chute is provided cooperatively associated with the rotatable member and in communication with the chamber for receiving oriented parts delivered by the chamber and by the slots and delivering the oriented part to an output station.

Referring now to FIG. 1, conveying means 1 is shown for conveying a hollow cylindrical part 2 to a first station 3 of rotatable slotted drum 4. The means 1 is a track along which hollow parts are conveyed by means (not shown) which urge parts 2 towards the rotatable drum.

The slotted drum 4 is mounted on a rotatable shaft 5 and secured thereto by key 6 in shaft 5 (note FIG. 2). The drum has a plurality of open slots 8 radially disposed therein extending to the periphery thereof, each of the slots having a finger 9 extending radially from the bottom thereof and terminating intermediate the bottom and the top, for example at approximately the middle, of each of the slots. The fingers are adapted to enter the interior of the part through the opening thereof and carry it to discharge station 10 of the drum where it is delivered bottom-down to chute 23 or axially reversed of its original position. Where the hollow part enters the slots bottom-down first, it is prevented by fingers 9 from going all the way into the slot. Instead, its bottom rests on the tip of finger 9 with almost half of the length of the part extending out of the slot (note position 11 in FIG. 1), in which position the drum carries it to an intermediate discharge station 12 where it is transversely deflected by pawl means 13 which is pivotally connected to a stationary cover plate 17 and which is biased inward of the slots by a biasing spring 14 (note FIG. 4), the biasing being effected by means of spring extensions 15 and 16 which are anchored to keep the spring under compression.

The stationery cover plate 17 is shown partially broken away in FIG. 1, the plate having an opening 18 therein into which the finger portion of pawl 13 projects, the pawl 13, being mounted on face plate 17 on lug 19 as shown in FIG. 3.

Adjacent the other face of the rotatable drum is provided a stationary chamber 20 into which the bottom ended parts 2 are transversely deflected, the chamber tapering downwardly into an outlet portion 21 which enters mouth 22 of chute 23 and from there to output station 23a. The manner in which hollow part 2 is transversely deflected by pawl 13 from the slot is shown in FIG. 2. The method by which the desired orientation of the hollow part is achieved will be evident from the following description.

Assuming hollow part 2 enters the slot open-end first at station 3 as shown in the break-away view of the part, finger 9 enters the interior of the part and carries it in the clockwise direction towards discharge station 10 of the feed mechanism. As the part passes intermediate discharge station 12, the finger upon which it is supported prevents it from being deflected from the slot by pawl means 13 which is cammed to one side by its contact with the finger-supported part 2. When the part reaches discharge end 10, it falls by gravity into chute 23 bottom-end down, that is axially reversed of its original charging position but in the preferred oriented position.

Assuming on the other hand that part 2 has entered a slot bottom-end down, as shown in position 11 of FIG. 1, it is carried clockwise in this position by the slot in which it is confiend until it reaches intermediate discharge station 12 where pawl 13 by the action of its biasing spring 14 deflects part 2 transversely so that it lands bottom-end down in chamber 20 where it is carried bottom-end first to outlet portion 21 into chute 23 in the same oriented position as the previous part.

It is thus apparent that the hopper feeding mechanism illustrated accepts all parts, no matter how they are oriented and discharges them continuously in one direction in the desired orientation without requiring the recycle of any parts not correctly oriented.

The invention is advantageous in feeding hollow parts to a filling station, where the correct orientation of the part is a prerequisite to filling. In particular, the invention is applicable for feeding small closed end metal tubes, such as brass or copper tubing, to a working station for further processing, for example a deforming operation. As will be apparent, the invention is applicable to a variety of uses. For example, the invention may be adapted for feeding open-end capsules to a station for filling with a pharmaceutical or other ingredient.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A feeding mechanism for orienting in a preferred direction hollow parts having open and closed ends which comprises, a rotatable feeding member having open slots radially disposed therein extending to the periphery thereof and adapted to receive and confine therein a hollow part at a first station, a part-supporting finger in each of said slots extending radially from the bottom thereof and terminating intermediate the bottom and the top of each of the slots, said finger being adapted to enter the hollow of said part and carry it to a discharge station of the rotatable member, said discharge station being located relative to said first station to cause an axial reversal of said part, a pawl mounted near one face of said rotatable member and biased to enter each of said slots during rotation of said member and exert a transverse deflecting force without reversing the axial orientation of parts confined in said slots but not carried by the fingers therein, a chamber adjacent the other face of said rotatable member for receiving parts deflected therein by said pawl, and an output chute cooperatively associated with the rotatable member communicating with said chamber for receiving oriented parts delivered by said chamber and by said slots.

2. A feeding mechanism for orienting in a preferred direction hollow parts having open and closed ends which comprises, a rotatable feeding drum having open slots radially disposed therein extending to the periphery thereof and adapted to receive and confine therein a hollow part at a first station, a part-supporting finger in each of said slots extending radially from the bottom thereof and terminating intermediate the bottom and the top of each of the slots, said finger being adapted to enter the hollow of said part and carry it to a discharge station of the drum, said discharge station being located relative to said first station to cause an axial reversal of said part, a stationary face plate adjacent one face of said rotatable drum, a pawl mounted on said face plate next to an opening therein, said pawl being biased to enter each of said slots through said face plate opening during rotation of said drum and exert a transverse deflecting force without reversing the axial orientation of parts confined in said slots but not carried by the fingers therein, an intermediate discharge chamber adjacent the other face of said rotatable member for receiving parts deflected therein by said pawl, and an output chute cooperatively associated with the rotatable drum communicating with said chamber for receiving oriented parts delivered by said chamber and by said slots.

3. A system for continuously feeding parts from an input station to an output station including a feeding mechanism for orienting in a preferred direction hollow parts having open and closed ends which comprises, means for conveying hollow parts to an input station, a rotatable feeding member next to said input station having open slots radially disposed therein extending to the periphery thereof and each adapted to receive a hollow part at said input station, a part-supporting finger in each of said slots extending radially from the bottom thereof and terminating intermediate the bottom and the top of each of the slots, said finger being adapted to enter the hollow of said part and carry it to a discharge station of the rotatable member, said discharge station being located relative to said first station to cause an axial reversal of said part, a pawl mounted near one face of said rotatable member and biased to enter each each of said slots during rotation of said member and exert a transverse deflecting force without reversing the axial orientation of parts confined in said slots but not carried by the fingers therein, an intermediate discharge chamber adjacent the other face of said rotatable member for receiving parts deflected therein by said pawl, a chute cooperatively associated with the rotatable member communicating with said chamber for receiving oriented parts delivered by said chamber and by said slots, and an output station for receiving parts defined by said chute.

4. A system for continuously feeding parts from an input station to an output station including a feeding mechanism for orienting in a preferred direction hollow parts having open and closed ends which comprises, means for conveying hollow parts to an input station, a rotatable feeding drum next to said input station having open slots radially disposed therein extending to the periphery thereof and each adapted to receive a hollow part at said input station, a part-supporting finger in each of said slots extending radially from the bottom thereof and terminating intermediate the bottom and the top of each of the slots, said finger being adapted to enter the hollow of said part and carry it to a discharge station of the drum, said discharge station being located relative to said first station to cause an axial reversal of said part, a stationary face plate adjacent one face of said rotatble drum, a pawl mounted on said face plate next to an opening therein, said pawl being biased to enter each of said slots through said face plate opening during rotation of said drum and exert a transverse deflecting force without reversing the axial orientation of parts confined in said slots but not carried by the fingers therein, an intermediate discharge chamber adjacent the other face of said rotatable member for receiving parts deflected therein by said pawl, a chute cooperatively associated with the rotatable drum communicating with said chamber for receiving oriented parts delivered by said chamber and by said slots, and an output station for receiving parts delivered by said chute.

References Cited in the file of this patent
UNITED STATES PATENTS
2,630,221    Stewart _____ Mar. 3, 1953